(12) United States Patent
Stabler et al.

(10) Patent No.: US 12,461,756 B2
(45) Date of Patent: *Nov. 4, 2025

(54) STORAGE DEVICE ENERGY CONSUMPTION EVALUATION AND RESPONSE

(71) Applicant: NetApp, Inc., San Jose, CA (US)

(72) Inventors: Gregory Eugene Stabler, Durham, NC (US); Edward John Barron, II, Pepperell, MA (US); Chris Boyd Grindstaff, Raleigh, NC (US); Michael James Rydeen, Fremont, NH (US)

(73) Assignee: NetApp, Inc., San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/115,353

(22) Filed: Feb. 28, 2023

(65) Prior Publication Data

US 2024/0045698 A1 Feb. 8, 2024

Related U.S. Application Data

(60) Provisional application No. 63/394,830, filed on Aug. 3, 2022.

(51) Int. Cl.
| | |
|---|---|
| *G06F 9/445* | (2018.01) |
| *G06F 1/26* | (2006.01) |
| *G06F 1/32* | (2019.01) |
| *G06F 3/06* | (2006.01) |
| *G06F 9/50* | (2006.01) |
| *G06F 11/30* | (2006.01) |

(52) U.S. Cl.
CPC ............ *G06F 9/44505* (2013.01); *G06F 1/26* (2013.01); *G06F 1/32* (2013.01); *G06F 3/0625* (2013.01); *G06F 3/0653* (2013.01); *G06F 3/067* (2013.01); *G06F 9/5094* (2013.01); *G06F 11/3062* (2013.01)

(58) Field of Classification Search
CPC ........ G06F 1/26; G06F 9/5094; G06F 3/0625; G06F 3/067; G06F 3/0653; G06F 11/3062; G06F 11/3409; G06F 1/32; G06F 9/44505
USPC ......................................... 713/100, 300, 320
See application file for complete search history.

(56) References Cited

U.S. PATENT DOCUMENTS 9,454,321 B1 * 9/2016 Smaldone ............... G06F 3/061
11,592,989 B1 * 2/2023 Gupta .................... G06F 3/0664
(Continued)

OTHER PUBLICATIONS

Non-Final Office Action mailed on Apr. 10, 2025 for U.S. Appl. No. 18/496,590, filed Oct. 27, 2023, 13 pages.

*Primary Examiner* — Ji H Bae
(74) *Attorney, Agent, or Firm* — Jaffery Watson Hamilton & DeSanctis LLP

(57) ABSTRACT

Various mechanisms and workflows are described that can utilize power and/or carbon footprint-based metrics to manage storage unit usage and/or configuration, which can provide a more efficient and environmentally friendly computing environment. In some example configurations, storage system management mechanisms collect power consumption for storage units (e.g., individual drives, storage shelfs, nodes, clusters) and can utilize the power consumption information with other storage unit characteristics to generate power and carbon footprint metrics.

22 Claims, 13 Drawing Sheets

(56) References Cited

U.S. PATENT DOCUMENTS

| | | | |
|---|---|---|---|
| 2014/0215041 A1* | 7/2014 | Mann | G06F 1/3206 |
| | | | 709/223 |
| 2016/0004475 A1* | 1/2016 | Beniyama | G06F 3/0613 |
| | | | 710/74 |
| 2018/0088807 A1 | 3/2018 | Zhao et al. | |
| 2020/0326871 A1 | 10/2020 | Wu et al. | |
| 2021/0326047 A1* | 10/2021 | Sillifant | G06F 11/1451 |
| 2022/0283716 A1* | 9/2022 | Shilane | G06F 3/0653 |
| 2023/0342276 A1* | 10/2023 | Dar | G06F 11/3075 |
| 2024/0069614 A1* | 2/2024 | Hiregoudar | G06F 3/0625 |

* cited by examiner

Workload Type Power Table 202

| Access Type 206 | Technology 208 | Energy Consumption (J) | Response Time (ms) | IOPS |
|---|---|---|---|---|
| Random Access | SSD | 0.850 | 3.162 | 1246.690 |
| | HDD | 2.937 | 17.248 | 231.897 |
| | Hybrid | 6.179 | 8.636 | 926.000 |
| Sequential Access | SSD | 2.055 | 36.901 | 108.396 |
| | HDD | 3.580 | 21.299 | 187.793 |
| | Hybrid | 10.734 | 14.173 | 564.599 |
| Mixed | SSD | 1.571 | 10.862 | 368.226 |
| | HDD | 3.089 | 19.711 | 202.922 |
| | Hybrid | 6.639 | 11.746 | 681.211 |

Operation Size Power Table 212

| Operation Type 216 | Operation Size 218 | Operation Type | Drive Type 220 | |
|---|---|---|---|---|
| | | | 1 TB HDD Power (W) | 120 GB SSD Power (W) |
| Write | 4 kB | Random | 0.0102094 | 0.0008643 |
| | | Sequential | 0.0003109 | 0.0001321 |
| | 1 MB | Random | 0.0411532 | 0.0328646 |
| | | Sequential | 0.0229215 | 0.0075362 |
| Read | 4 kB | Random | 0.0252030 | 0.0004737 |
| | | Sequential | 0.0001598 | 0.0001919 |
| | 1 MB | Random | 0.0455828 | 0.0086180 |
| | | Sequential | 0.0183449 | 0.0081872 |

STORAGE DEVICE ENERGY CONSUMPTION EVALUATION AND RESPONSE

CROSS-REFERENCE TO RELATED APPLICATION(S)

This application claims priority of U.S. Provisional Application No. 63/394,830, filed Aug. 3, 2022, entitled "Storage Device Energy Consumption Evaluation and Response," the contents of which are incorporated by reference herein.

TECHNICAL FIELD

Examples provided herein relate to monitoring and evaluating energy consumption by one or more computing resources. More particularly, examples provided herein related to assessment of energy consumption by storage units in complex computing environments to determine improvements in efficiencies and/or configurations.

BACKGROUND

When configuring or maintaining computing environments (e.g., data centers) various characteristics are evaluated and monitored. These characteristics can include, for example, resource consumption, which can be expected to be maintained within specified ranges. It is often desirable to have information related to resource consumption when configuring and/or maintaining computing environments.

BRIEF SUMMARY

In a system-based example, a system comprises one or more data storage devices and a management agent communicatively coupled with the one or more data storage devices, the management agent to collect metric-relevant information from at least the one or more data storage devices, to generate metrics associated with the one or more data storage devices based on at least the collected metric-relevant information, to generate one or more recommendations based on the generated metrics, to present, in a human-readable format, the one or more recommendations, to receive user input corresponding to selection of at least one of the one or more recommendations, to analyze the received user input to determine changes associated with the one or more data storage devices to implement the selected recommendations, and to cause the selected recommendations to be implemented.

In an example, the metrics are based, at least in part, on collected data gathered from the data storage devices that are part of a distributed storage system and from remote sources that provide device-specific specifications. In an example, the remote sources comprise at least characteristics corresponding to power sources available to provide power to one or more portions of the system.

In an example, the selected recommendations to be implemented comprise at least migration of data between specific data storage devices. In an example, the selected recommendations to be implemented comprise at least changes associated with an operating environment corresponding to at least a subset of the data storage devices. In an example, the selected recommendations to be implemented comprise at least deactivation of at least one of the data storage devices.

In an example, at least a portion of the recommendations are based, at least in part, on calculated metrics that can be compared to one or more of desired performance metrics, corresponding metrics of other components in an operating environment corresponding to at least a subset of the data storage devices.

In a management agent-based example, a management agent in a distributed storage system having one or more data storage devices, collects metric-relevant information from at least the one or more data storage devices, to generate metrics associated with the one or more data storage devices based on at least the collected metric-relevant information, to present, in a human-readable format, one or more recommendations based on the generated metrics, to receive user input indicating selection of at least one of the one or more recommendations, and to cause the selected recommendations to be implemented within the distributed storage system.

In an example, a first portion of the metrics are based, at least in part, on collected data gathered from the data storage devices that are part of a distributed storage system, a second portion of the metrics are collected from remote sources that provide device-specific specifications, and the human-readable format comprises one or more portions of a graphical user interface (GUI). In an example, at least characteristics corresponding to power sources available to provide power to one or more portions of the system.

In an example, the selected recommendations to be implemented comprise at least migration of data between specific data storage devices. In an example, the selected recommendations to be implemented comprise at least changes associated with an operating environment corresponding to at least a subset of the data storage devices. In an example, the selected recommendations to be implemented comprise at least deactivation of at least one of the data storage devices.

In an example, at least a portion of the recommendations are based, at least in part, on calculated metrics that can be compared to one or more of desired performance metrics, corresponding metrics of other components in an operating environment corresponding to at least a subset of the data storage devices.

In a further example, s non-transitory computer readable medium has stored thereon instructions that, when executed by one or more processors, cause a system to collect metric-relevant information from at least the one or more data storage devices, to generate metrics associated with the one or more data storage devices based on at least the collected metric-relevant information, to generate one or more recommendations based on the generated metrics, and to present, in a graphical user interface (GUI), the one or more recommendations having corresponding interface buttons, selection of which cause the selected recommendations to be implemented.

In an example, a first portion of the metrics are based, at least in part, on collected data gathered from the data storage devices that are part of a distributed storage system, and a second portion of the metrics are collected from remote sources that provide device-specific specifications. In an example, the second portion of the metrics comprises at least characteristics corresponding to power sources available to provide power to one or more portions of the system.

In an example, the selected recommendations to be implemented comprise at least migration of data between specific data storage devices. In an example, the selected recommendations to be implemented comprise at least changes associated with an operating environment corresponding to at least a subset of the data storage devices. In an example, at least a portion of the recommendations are based, at least in part, on calculated metrics that can be compared to one or more of desired performance metrics, corresponding metrics of other components in an operating environment corresponding to at least a subset of the data storage devices.

BRIEF DESCRIPTION OF THE DRAWINGS

The present disclosure is best understood from the following detailed description when read with the accompanying figures.

FIG. 2A is a table of example power consumption for various workload types.

FIG. 2B is a table of example power consumption for various operation sizes.

Figure 1:
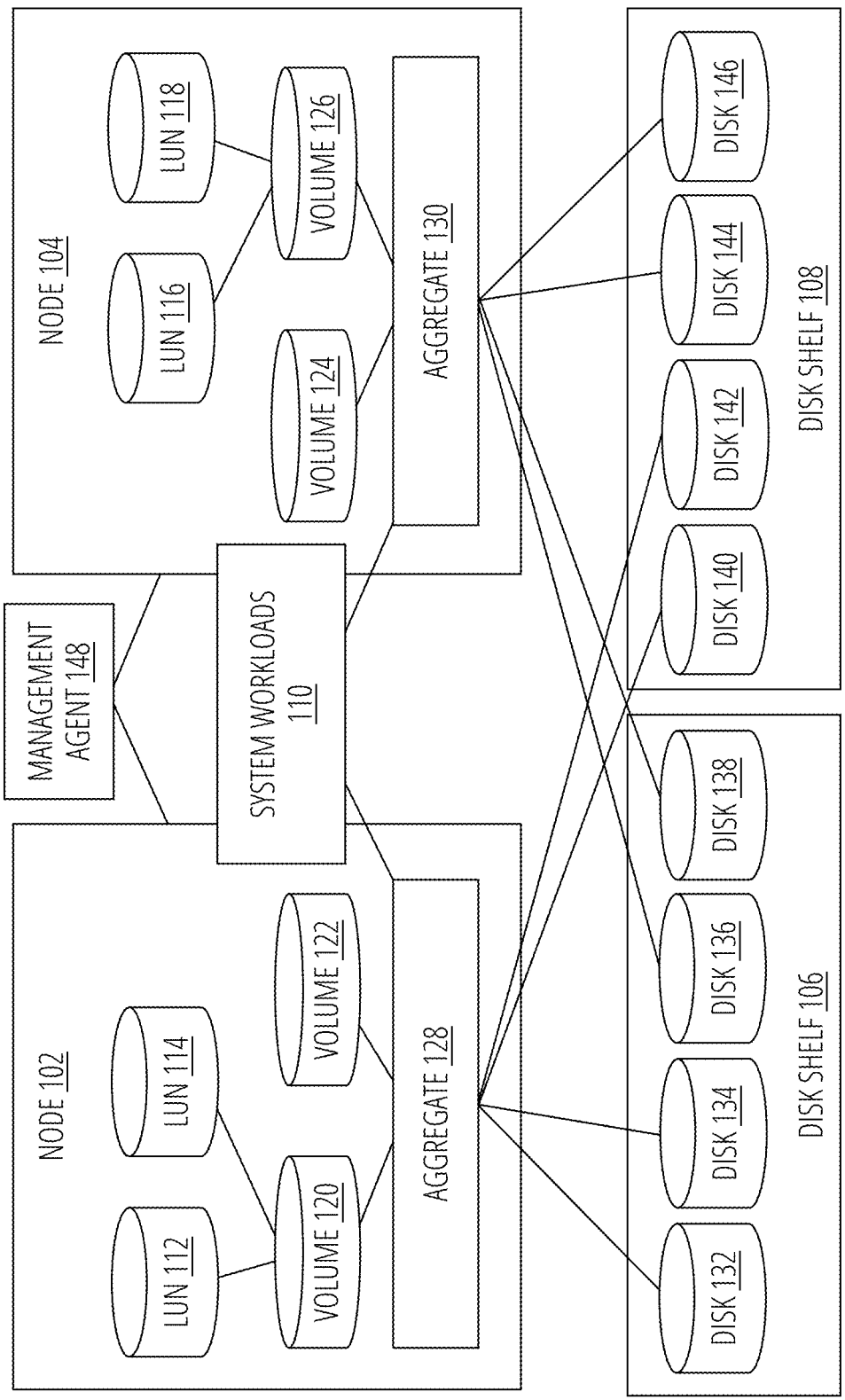
FIG. 1 is a block diagram of an example computing system where storage unit energy consumption can be monitored and utilized for management and/or configuration purposes.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

As discussed above, when configuring and/or managing computing environments techniques and approaches described below can provide functionality to utilize power-based metrics, capacity-based metrics and/or carbon footprint-based metrics for management of storage resources (e.g., one or more components of a distributed storage system, one or more components of a data center) within a computing environment. For example, a storage administrator can be enabled to make decisions and/or implement changes based on power utilization/consumption ramifications. Further, recommendations and/or streamlined reconfiguration operations can be implemented based on power recommendations. That is, power optimization and power usage ramifications can be used to manage configuration and/or operation of one or more storage system resources.

Various mechanisms and workflows are described that can utilize power, capacity and/or carbon footprint-based metrics to manage storage unit usage and/or configuration, which can provide a more efficient and environmentally friendly computing environment. In some example configurations, storage system management mechanisms collect power consumption information for storage devices (e.g., individual drives, storage shelves, nodes, clusters) and can utilize the power consumption information with other storage unit characteristics to generate power, capacity and/or carbon footprint metrics. Example approaches are described in greater detail below.

In some operating environments, the cost of different types of power (e.g., coal powered, solar, nuclear, hydro, wind, wave power), can be a function of time. Similarly, the "greenness" of power sources may be a function of time, for example, solar power may not be available during certain times. In the examples that follow, real-time telemetry can be utilized to provide power cost and/or power carbon footprint values. In alternative example, static power and/or carbon footprint values may be sufficient.

FIG. 1 is a block diagram of an example computing system where storage unit energy consumption can be monitored and utilized for management and/or configuration purposes. The example computing system of FIG. 1 includes two nodes and two disk shelves; however, any number of nodes and disk shelves can be supported. Management agent 148 provides device and system management functionality as described herein. In an example, management agent 148 includes at least a component or layer of ONTAP software available from NetApp, Inc. of San Jose, CA. Other storage management systems can also be supported. In an example, management agent 148 can provide one or more of the power-based metrics, capacity-based metrics and/or carbon footprint-based metrics for management of storage resources and/or management agent 148 can provide recommendations and/or streamlined reconfiguration operations can be implemented based on power recommendations. Further example functionalities that can be provided by management agent 148 are described in greater detail below.

In various examples nodes (e.g., node 102, node 104) can be interconnected with one or more disk shelves (e.g., disk shelf 106, disk shelf 108), which can include any number of physical disks. Nodes may service read requests, write requests, or both received from one or more client devices (not illustrated in FIG. 1) or via system workloads 110. Management mechanisms that can be used with nodes are described in greater detail below.

As illustrated in FIG. 1, an LUN (e.g., LUN 112, LUN 114, LUN 116, LUN 118) is a logical representation of a storage unit. In an example, a LUN can appear as a hard disk (or similar storage unit) to a client device and can appear as a file inside a volume (e.g., volume 120, volume 122, volume 124, volume 126). Aggregates (e.g., aggregate 128, aggregate 130) are representations of storage space that can be utilized and/or managed by the management mechanisms described below. In an example, an aggregate can represent storage space provided by one or more RAID (Redundant Array of Independent Disks) arrays that can be provided by, for example, the disks of disk shelf 106 and disk shelf 108.

In the example of FIG. 1, disk shelf 106 includes disk 132, disk 134, disk 136 and disk 138, and disk shelf 108 includes disk 140, disk 142, disk 144 and disk 146. Further in the example of FIG. 1, aggregate 128 of node 102 is coupled with disk 132 and disk 134 in disk shelf 106, and with disk 140 and disk 142 in 108. Similarly, aggregate 130 of node 104 is coupled with disk 136 and disk 138 in disk shelf 106, and with disk 144 and disk 146 in disk shelf 108. Other configurations can also be supported.

Each of the various storage units consumes energy during operation. As described in greater detail below, storage system monitoring mechanisms (e.g., management agent 148 and/or other system components) can monitor nodes of a storage cluster and calculate power consumption for various storage units (e.g., disks) or groups of storage units (e.g., disk shelves, nodes, clusters). The calculated power consumption information can be utilized for management and/or for configuration purposes.

In an example, power consumption information can be acquired by utilizing one or more application program interfaces (APIs) to communicate with one or more storage units, groups of storage units, nodes, clusters, management systems, etc. One example of an API that can be used for this purpose is provided in FIG. 12 (e.g., 1222). Other API configurations can also be utilized to acquire power consumption information.

In an example, power and current information can be obtained via APIs and/or other mechanisms and then power consumption metrics, capacity metrics and/or carbon footprint metrics can be determined. Specific example approaches to determining these metrics are provided below. In some examples, the power information may be normalized to account for various differences in data source (e.g., power determined at the power supply, power determined other than at the power supply). Normalization can be used between the various metrics.

In some examples, the determined metrics can be provided to a user/administrator through dashboards presented via one or more graphical user interfaces (GUIs). Some example dashboards are illustrated in FIG. 3, FIG. 4, FIG. 5 and FIG. 6. Two example metrics that can be provided (or used to determine other metrics) can be input/output operations per second (IOPS) per Watt (i.e., IOPS/Watt) and Watts per storage capacity (e.g., Watts/TB, Watts/MB, Watts/PB).

The IOPS/Watt metric can provide insight into power consumption in terms of throughput, and the Watts/TB metric can be useful in comparing systems. Carbon footprint metrics can be determined from either or both metrics. Thus, use of these two metrics can allow, for example, comparison between different storage shelves. Further, these metrics can be used at the cluster or node level to determine cluster or node level metrics. As another example, these metrics may be used to compare workloads. Additional and/or different metrics can also be utilized.

Using the metrics described herein, management and forecasting can be performed at the device, cluster, node, aggregate, workload and/or data center level. In an example, power consumption can be calculated for one or more disk shelves (e.g., disk shelf 106, disk shelf 108) and for one or more nodes (e.g., node 102, node 104). In some examples, metrics for nodes and disk shelves can be combined to determine cluster power consumption. For controllers with integrated disk shelves, the node power can include the integrated disk shelf.

In some examples, machine learning (ML) techniques and analytics techniques can be used to recommend, for example, certain workloads be tiered to cloud storage because they may not be actively involved in processing input/output (I/O) traffic, yet still contributing to the carbon footprint of the spinning disk. As part of this type of recommendation, an estimate of the power savings and/or carbon footprint savings that can be achieved can be presented to a user or administrator (see example interfaces in FIG. 3, FIG. 4, FIG. 5 and FIG. 6).

Specific example approaches to determining power savings are provided; however, alternate approaches could also be supported. In an example, power savings can be calculated as:

$$\text{Power Savings} = \frac{\text{Cold Data Capacity}(TB)}{\text{Number of } 1TB \text{ Disks}} * Avg \text{ Power of } 1TB \text{ Disk}$$

The average power of a 1-TB disk can be obtained from a manufacturer specification, for example. This example approach uses the power of a 1 TB disk as an estimate because, for cold data at rest, the individual disk power consumption is difficult to determine. Alternate estimates can also be used.

The power savings can be converted to a carbon footprint savings, for example, based on carbon emission rate per megawatt-hour information from reputable sources (e.g., EPA.gov). In some examples, users may be allowed to enter or edit carbon emission rate information.

As another approach to determine power savings, first average power consumed by each disk can be determined:

$$\text{Disk Power} = \frac{\text{Storage Shelf Power}}{\text{Number of Disks}}$$

More discrete approaches can be used to take into account mixed disk types like HDD or SSD and RAID positioning to weight the power consumption. The aggregate disk power can then be calculated:

$$\text{Aggregate Power} = \Sigma(\text{Disk Power})$$

by summing the disk power for all relevant disks. Then the power savings can be calculated:

$$\text{Power Savings} = \frac{\text{Cold Data Capacity }(TB)}{\text{Aggregate Total Capacity}} * \text{Aggregate Power}$$

Figure 5:
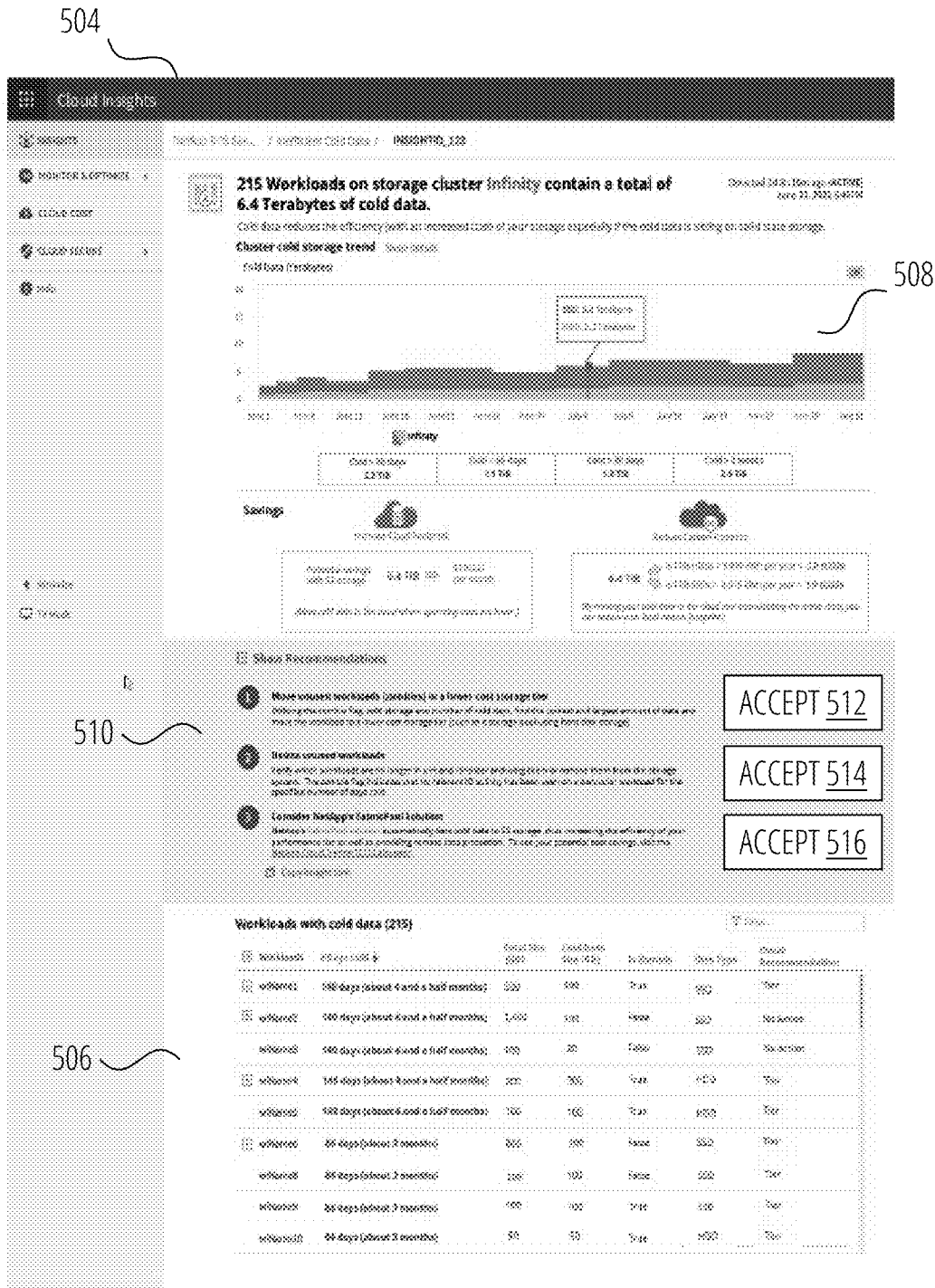
FIG. 5 is an example graphical user interface dashboard that can provide power metric and/or carbon footprint metric trend information with respect to reconfiguration of cold storage.

The power savings can then be converted to carbon footprint savings. An example GUI for presenting cold data analysis with associated power savings and/or carbon footprint savings is illustrated in FIG. 5.

The GUIs of FIG. 3, FIG. 4, FIG. 5 and FIG. 6 (or comparable GUIs) can be used to present the power savings and/or carbon footprint savings information to a user. In other examples, additional and/or different metrics can be presented. For example, end of life (or early replacement) of devices can be analyzed and estimated to determine if updated replacement strategies would result in improved power savings and/or carbon footprint savings.

In other example approaches, storage tier power consumption can be calculated based on power consumption by each aggregate (e.g., aggregate 128, aggregate 130). This can be accomplished by estimating disk power based on the IOPS processed by each disk:

Storage Shelf Total IOPS=Σ(Disk Total IOPS)

by summing total IOPS for all relevant disks. Disk power can be calculated as:

$$\text{Disk Power} = \frac{\text{Disk Total }IOPS}{\text{Storage Shelf Total }IOPS} * \text{Storage Shelf Power}$$

If the Storage Shelf Total IOPS is zero, the shelf power can be distributed to every disk evenly because idle disks still consume power. Aggregate power can be determined as:

Aggregate Power=Σ(Disk Power)

by summing the disk power for all relevant disks. Then the tier power can be calculated as:

Tier Power=Σ(Aggregate Power)

by summing all aggregates for the same tier. After determining the storage tier power, an analysis of power consumption for each storage tier and which aggregates are consuming the most power in the tier can be provided via a dashboard or other interface. Aggregates can be ranked, for example based on IOPS/Watt and Watts per storage capacity so that a user can determine which aggregates (e.g., aggregate 128, aggregate 130) are least efficient. Further, for each aggregate, the interface can provide metrics associated with the busiest workloads based on, for example, IOPS or throughput. Recommendations can be provided based on this analysis.

When determining the power consumption metrics described herein different power consumption values can be used for read, write and idle because disks consume power differently depending on what operations are being performed. Thus, differentiating operations by read, write and idle can provide a more accurate and useful analysis and corresponding recommendations.

FIG. 2A is a table of example power consumption for various workload types. Workloads can also consume power differently depending on whether the workloads are random, sequential or mixed workloads. Workload type power table 202 provides example values illustrating potential differences in power consumption for different access type 206 (e.g., random access, sequential access, mixed) and for different device technology 208 (e.g., Solid State Drive (SSD), Hard Disk Drive (HDD), Hybrid).

When determining the power consumption metrics described herein different power consumption values can be used based on access type and/or technology because disks consume power differently depending on the type of memory technology being utilized and the type of access being made. Thus, differentiating operations by access type 206 and/or technology 208 can provide a more accurate and useful analysis and corresponding recommendations.

FIG. 2B is a table of example power consumption for various operation sizes. Workloads can also consume power differently depending on operation type (e.g., read, write) and request size (e.g., 4 kB, 1 MB). Operation size power table 212 provides example values illustrating potential differences in power consumption for different operation type 216 (e.g., write, read), operation size 218, and for different drive type 220 (e.g., 1 TB HDD, 120 GB SSD).

When determining the power consumption metrics described herein different power consumption values can be used based on operation type, workload size and/or drive type because disks consume power differently depending on the type of memory technology being utilized and the size and type of operation being performed. Thus, differentiating operations by operation type 216, operation size 218 and/or drive type 220 can provide a more accurate and useful analysis and corresponding recommendations.

Various approaches can be used to determine workload power. In an example, workload power can be estimated by apportioning shelf and node power based on workload IOPS. In one example approach differences in I/O operation size and I/O operation characteristics are ignored and all disks are assumed to be of the same type. In another example approach one or more lower-level differences (e.g., I/O operation size, I/O operation characteristics, disk type) are considered as part of the power consumption evaluation process.

In an example, for shelf power, the aggregate power approach described above can be utilized:

Aggregate Power=Σ(Disk Power)

by summing the disk power for all relevant disks. A workload's Aggregate Power can be determined by:

$$\text{Workload Aggregate Power} = \frac{\text{Workload Total }IOPS}{\text{Aggregate Total }IOPS} * \text{Aggregate Power}$$

In an example, for Workload Total IOPS the IOPS that have been served by a management mechanism cache may be excluded. A workload's Node Power can be determined by:

$$\text{Workload Node Power} = \sum \left( \frac{\text{Workload Total }IOPS}{\text{Node Total }IOPS} * \text{Node Power} \right)$$

summed for all nodes. In an example, for Node Total IOPS, both user-defined and system workloads can be included. Workload Power can be calculated as:

Workload Power=Workload Aggregate Power+Workload Node Power

With the determination of workload power consumption, IOPS/Watt for each workload can be determined to find which workloads are least efficient and to make recommendations for relocating the least efficient workloads. In an example, IOPS/Watt can be calculated as:

$$IOPS \text{ per Watt} = \frac{\text{Workload Total } IOPS}{\text{Workload Power}}$$

In an example, as part of workload power analysis, the power consumption for each aggregate and each node can be calculated. The workloads that have the lowest IOPS/Watt (i.e., least efficient workloads) can be identified and recommendations can be made to increase workload efficiency, for example, by moving the workload to a different device. As described with respect to FIG. 3, FIG. 4, FIG. 5 and FIG. 6 recommendations can be made via a dashboard or other interface mechanism and implementation of the recommendations can be performed by management mechanisms in response to a user accepting the recommendations (e.g., accept suggestion 304 button, accept suggestion 404 button, accept button 512 button, accept button 612 button).

For example, if an inefficient workload is running on an HDD, that workload could be moved to an aggregate that uses SSDs to reduce power consumption. The recommendation can be based on an aggregate's IOPS/Watt and or Watts per storage capacity to identify more efficient aggregates. As another example, some nodes may have lower IOPS/Watt because they are newer and have more efficient hardware or are less utilized. Workloads with high IOPS/Watt can be moved to these nodes to improve workload IOPS/Watt.

As another example, some workloads are periodic in nature (e.g., scheduled jobs, backups). These periodic workloads can be scheduled for a time when a node is less busy to reduce peak power consumption of the node.

In another example, efficiency and/or carbon footprint can be determined based on capacity rather than IOPS/Watt. In an example, for shelf power, the aggregate power approach described above can be utilized:

Aggregate Power=Σ(Disk Power)

by summing the disk power for all relevant disks. A workload's Aggregate Power can be determined by:

$$\text{Workload Aggregate Power} = \frac{\text{Workload Total Capacity}}{\text{Aggregate Total Capacity}} * \text{Aggregate Power}$$

In an example, a workload's Node Power can be determined by:

$$\text{Workload Node Power} = \sum \left( \frac{\text{Workload Total Capacity}}{\text{Node Total Capacity}} * \text{Node Power} \right)$$

summed for all nodes. Workload Power can be calculated as:

Workload Power=Workload Aggregate Power+Workload Node Power

With the determination of workload power consumption, relevant capacity for each workload can be determined to find which workloads are least efficient and to make recommendations for relocating the least efficient workloads. In an example, workload capacity can be calculated as:

$$\text{Workload Capacity} = \frac{\text{Workload Total Capacity}}{\text{Workload Power}}$$

In an example, as part of workload power analysis, the power consumption for each aggregate and each node can be calculated. The workloads that have the lowest capacity (i.e., least efficient workloads) can be identified and recommendations can be made to increase workload efficiency, for example, by moving the workload to a different device. As described with respect to FIG. 3, FIG. 4, FIG. 5 and FIG. 6 recommendations can be made via a dashboard or other interface mechanism and implementation of the recommendations can be performed by management mechanisms in response to a user accepting the recommendations (e.g., accept suggestion button 304, accept suggestion 404 button, accept button 512 button, accept button 612 button).

Figure 3:
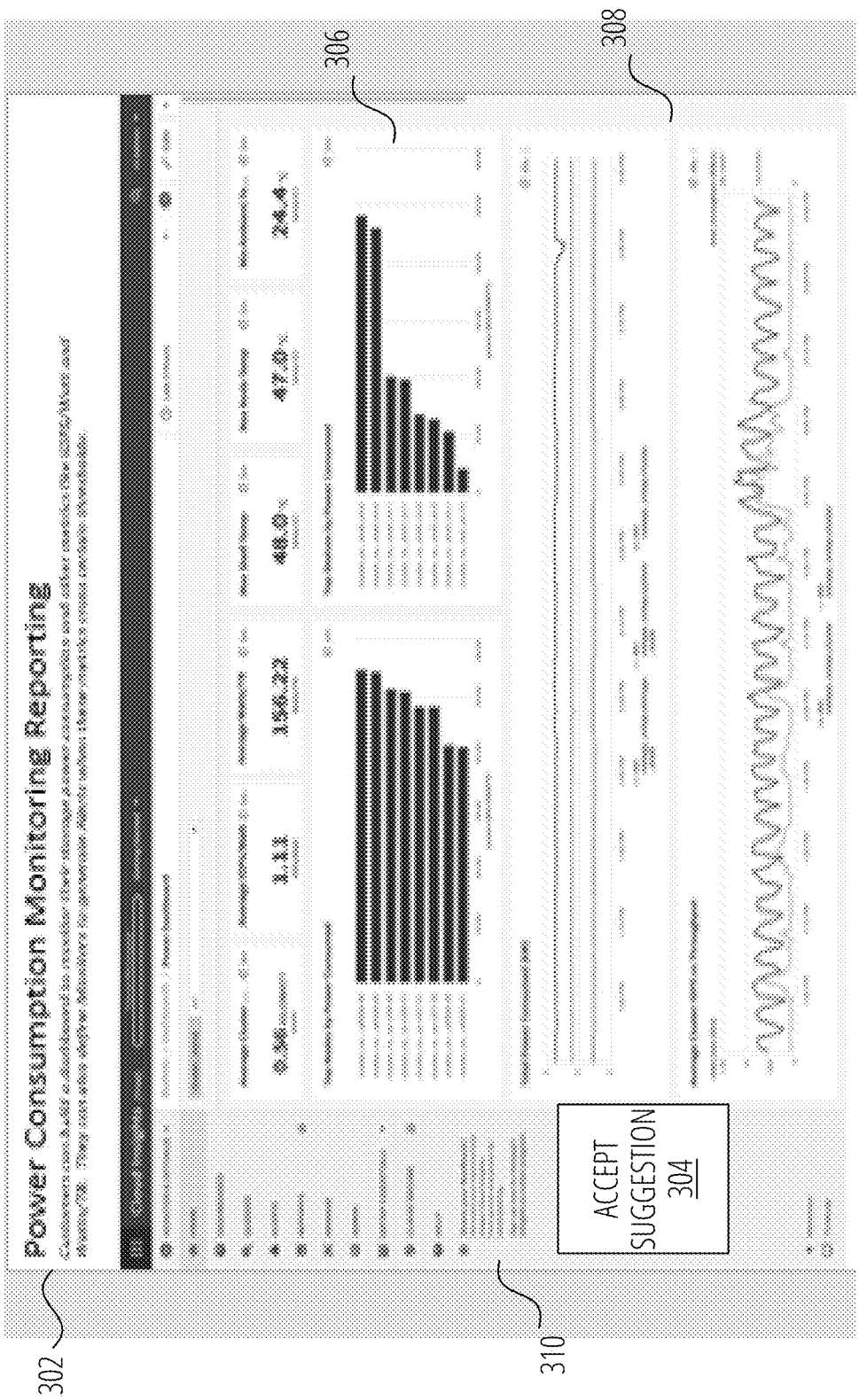
FIG. 3 is an example graphical user interface dashboard that can provide power metric and/or carbon footprint metric information.

FIG. 3 is an example graphical user interface dashboard that can provide power metric and/or carbon footprint metric information. Example dashboard 302 as illustrated in FIG. 3 is one example and is based on collection of metrics to generate and respond to alerts based on, for example, power consumption and/or carbon footprint metrics.

In an example, metrics can be presented as a historical set of data for one or more devices (or groups of devices) 306, and/or metrics can be presented as a comparison between different devices (or groups of devices) 308. In some examples, temperature information can be collected to determine one or more metrics associated with operation of the monitored storage units.

In some examples, temperature information can include one or more of a temperature corresponding to a storage unit, a temperature corresponding to an enclosure having a storage unit, a temperature of a computing resource (e.g., processor, GPU), a temperature corresponding to a room within a lab or data center. Temperature information can be used, for example, to evaluate operating conditions in the lab/data center as part of a carbon footprint metric. For example, an evaluation can be performed to determine if a change to the operating temperature of the lab/data center would improve or diminish operation of components (e.g., storage units, nodes) within the lab/data center.

In some examples, example dashboard 302 can include one or more suggestions or recommendations 310 to improve operational efficiency of the monitored devices and storage systems based on the metrics being utilized. Example suggestions or recommendations can include, for example, one or more of: moving data from a currently used drive to a different drive, putting drives to sleep, putting nodes to sleep, performing certain operations or data migrations during specified times (e.g., schedule changes), changing heating, ventilation and air conditioning (HVAC) settings in a lab, room or data center. These are a few sample suggestions and recommendations that can be made based on the determined metrics. Additional and/or different types of suggestions and recommendations can also be provided.

In some examples, example dashboard 302 can include one or more accept suggestion 304 buttons (only one accept suggestion 304 illustrated in FIG. 3). The accept suggestion 304 button can allow a user to accept a suggestion (or recommendation) presented via example dashboard 302 and have the accepted suggestion automatically implemented. In an example with multiple accept suggestion buttons, a list (or other presentation) of recommendations/suggestions can be provided with corresponding buttons.

In an example, analysis of the utilized metrics may indicate that data should be moved from a currently utilized disk shelf to a more efficient disk shelf during a generally low use time and during a time in which the relevant data centers are being powered via renewable energy sources. If an administrator agrees with the suggestion, they can use accept suggestion 304 button to cause the suggestion to be implemented by the various management mechanisms that manage operation of the relevant storage units.

As another example, evaluation of operation of one or more power supplies and control systems corresponding to storage systems with respect to the ambient temperature of the room in which they reside may result in a suggestion that the temperature of the room can be increased (i.e., reduced air cooling), which can result in a smaller carbon footprint. Acceptance of the suggestion via accept suggestion 304 button can result in the temperature of the room being automatically changed (or the heating/cooling schedule changed). These are but a few example suggestions that can be presented and/or accepted via example dashboard 302. Many other suggestions and recommendations can be presented and accepted via similar dashboards.

Figure 4:
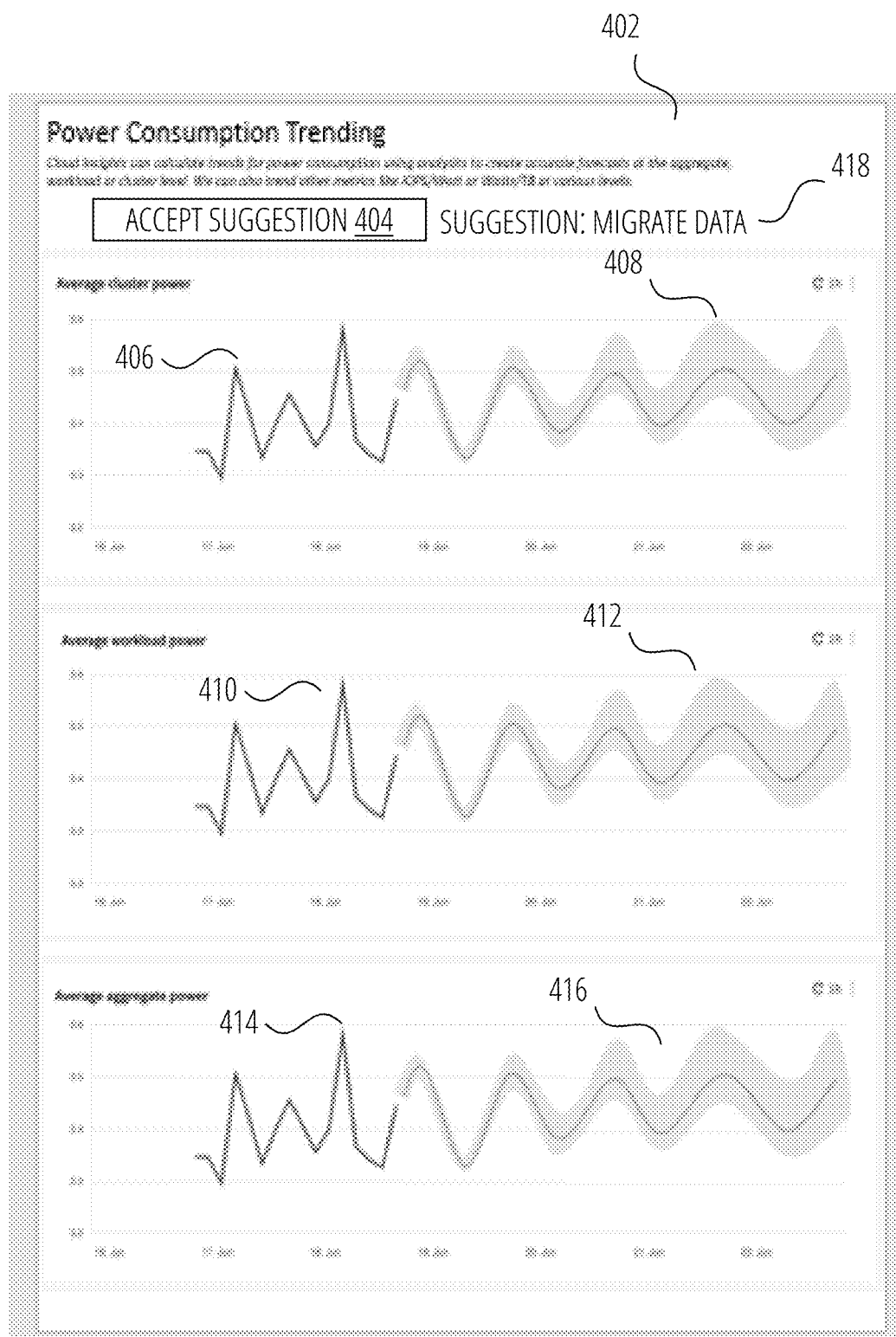
FIG. 4 is an example graphical user interface dashboard that can provide power metric and/or carbon footprint metric trend information.

FIG. 4 is an example graphical user interface dashboard that can provide power metric and/or carbon footprint metric trend information. Example trend dashboard 402 as illustrated in FIG. 4 is one example and is based on collection of metrics to generate trend information based on, for example, power consumption and/or carbon footprint metrics.

In an example, metrics can be presented as historical data 406, 410 as well as future trends 408, 412, 416 for one or more devices (or groups of devices). The metrics presented in example trend dashboard 402 can include, for example, IOPS/Watt, Watts per storage capacity, temperature and/or additional metrics. In some examples, example trend dashboard 402 can include one or more suggestions or recommendations 418 to improve operational efficiency of the monitored storage devices and storage systems based on the metrics being utilized. Temperature information can also be included in the metrics presented in example trend dashboard 402.

In some examples, example trend dashboard 402 can include one or more accept suggestion 404 buttons (only one accept suggestion 404 illustrated in FIG. 4). Accept suggestion 404 button can allow a user to accept a suggestion (or recommendation) 418 presented via example trend dashboard 402 and have the accepted suggestion automatically implemented. If an administrator agrees with the suggestion, they can use accept suggestion 404 button to cause suggestion 418 to be implemented by the various management mechanisms that manage operation of the relevant storage units.

FIG. 5 is an example graphical user interface dashboard that can provide power metric and/or carbon footprint metric trend information with respect to reconfiguration of cold storage. Example cold storage recommendation dashboard 504 as illustrated in FIG. 5 is one example and is based on collection of metrics to generate trend information based on, for example, power consumption and/or carbon footprint metrics for cold storage management.

In an example, metrics can be presented as historical data 506 as well as cold data trends 508 for one or more devices (or groups of devices). The metrics presented in example cold storage recommendation dashboard 504 in GUI 502 can include, for example, IOPS/Watt, Watts per storage capacity, temperature and/or additional metrics. In some examples, example cold storage recommendation dashboard 504 can include one or more suggestions/recommendations 510 to improve operational efficiency of the monitored storage devices and storage systems based on the metrics being utilized. Temperature information can also be included in the metrics presented in example cold storage recommendation dashboard 504.

In some examples, example cold storage recommendation dashboard 504 can include one or more accept buttons (e.g., accept button 512, accept button 514, accept button 516). The accept buttons can allow a user to accept a corresponding suggestion/recommendation (e.g., one or more of suggestions/recommendations 510) presented via example cold storage recommendation dashboard 504 and have the accepted suggestion(s) automatically implemented. If an administrator agrees with the suggestion, they can use an accept button to cause the suggestion to be implemented by the various management mechanisms that manage operation of the relevant storage units.

Figure 6:
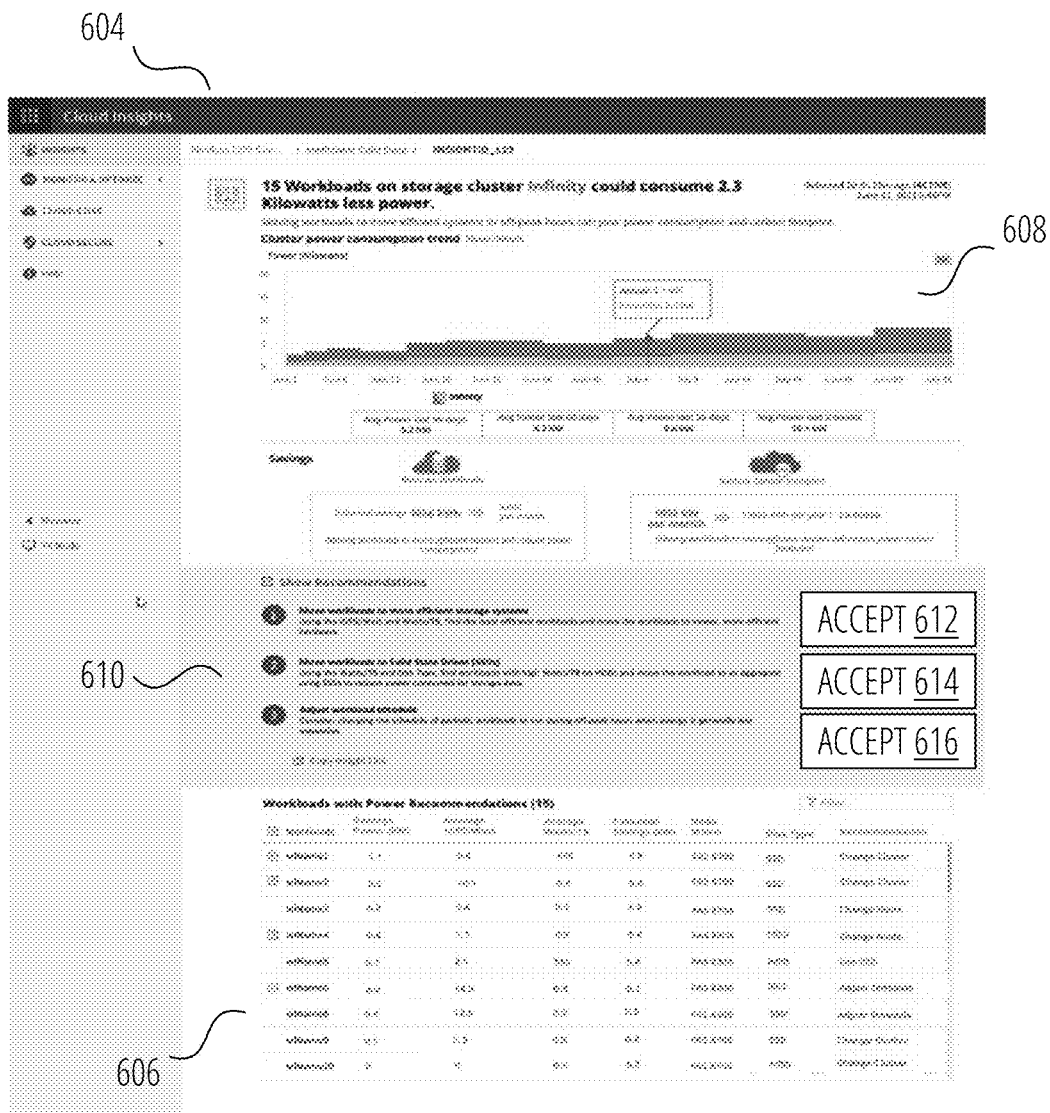
FIG. 6 is an example graphical user interface dashboard that can provide power metric and/or carbon footprint metric trend information with respect to reconfiguration of storage resources.

FIG. 6 is an example graphical user interface dashboard that can provide power metric and/or carbon footprint metric trend information with respect to reconfiguration of storage resources. Example storage device recommendation dashboard 604 as illustrated in FIG. 6 is one example and is based on collection of metrics to generate trend information based on, for example, power consumption and/or carbon footprint metrics for storage unit management.

In an example, metrics can be presented as historical data 606 as well as trends 608 for one or more devices (or groups of devices). The metrics presented in example storage device recommendation dashboard 604 in GUI 602 can include, for example, IOPS/Watt, Watts per storage capacity, temperature and/or additional metrics. In some examples, example storage device recommendation dashboard 604 can include one or more suggestions/recommendations 610 to improve operational efficiency of the monitored storage devices and storage systems based on the metrics being utilized. Temperature information can also be included in the metrics presented in example storage device recommendation dashboard 604.

In some examples, example storage device recommendation dashboard 604 can include one or more accept buttons (e.g., accept button 612, accept button 614, accept button 616). The accept buttons can allow a user to accept suggestions/recommendations 610 and have the accepted suggestion automatically implemented. If an administrator agrees with the suggestion, they can use an accept button to cause the suggestion to be implemented by the various management mechanisms that manage operation of the relevant storage units.

Figure 7:
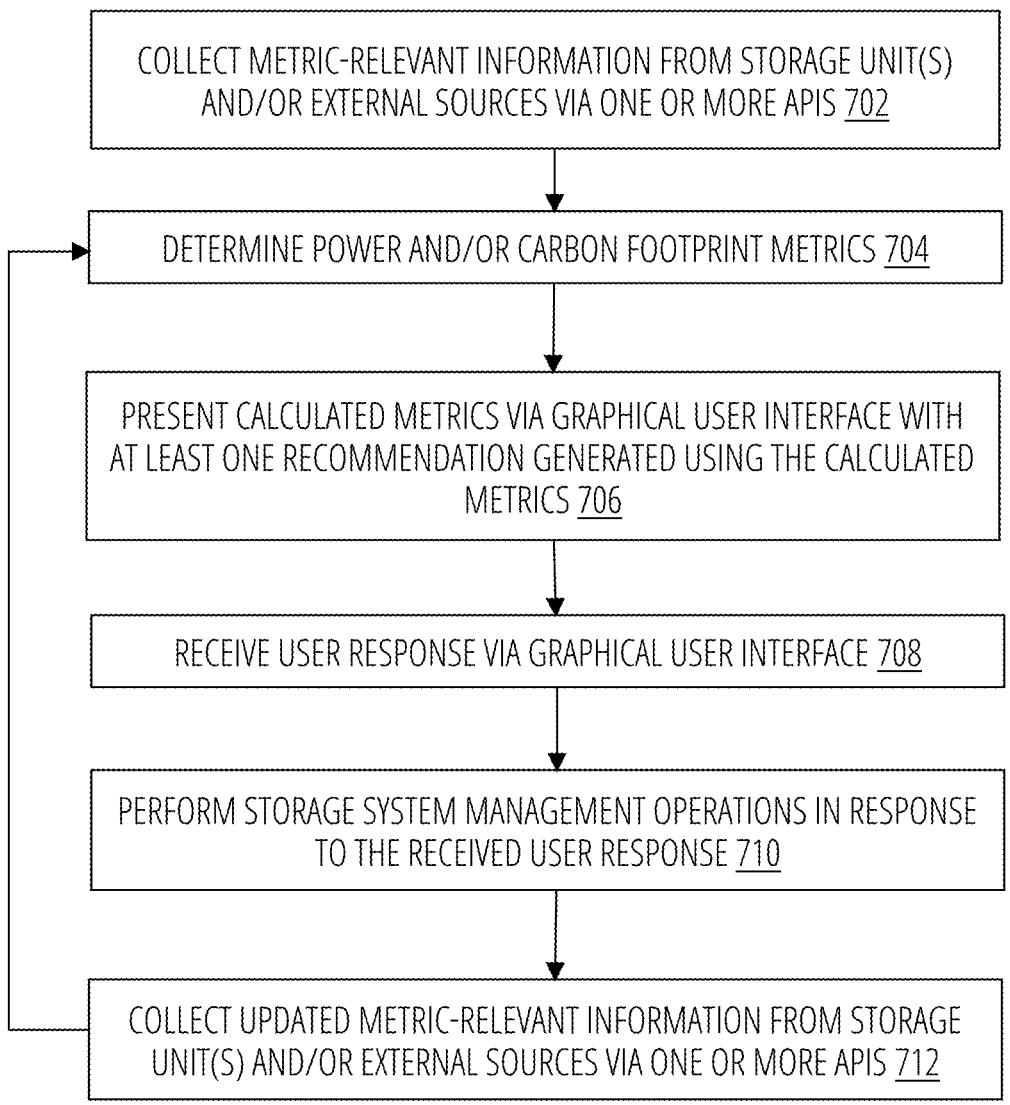
FIG. 7 is a flow diagram for one technique for evaluation of and response to metrics corresponding to data storage systems.

FIG. 7 is a flow diagram for one technique for evaluation of and response to metrics corresponding to data storage systems. The example technique of FIG. 7 can be provided, for example, by management agent 148 or other system having storage management functionality.

Metric-relevant information is collected from storage unit(s) and/or external sources via one or more APIs, in block 702. As discussed above, information (e.g., power usage, device type, workload characteristics) can be gathered from storage units (e.g., SSD, HDD, Hybrid) and/or from remote sources (e.g., device specifications). Temperature information can also be gathered.

Power and/or carbon footprint metrics are determined, in block 704. The power and/or carbon footprint metrics can be determined using one or more of the example approaches described above.

Calculated metrics with at least one recommendation based on the calculated metrics are presented via a graphical user interface, in block 706. In an example, the recommendation(s) can be generated using machine learning techniques. Metrics can be provided via dashboards (e.g., example dashboard 302, example trend dashboard 402, example cold storage recommendation dashboard 504, example storage device recommendation dashboard 604) presented on one or more graphical user interfaces.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

A user response is received via the graphical user interface, in block 708. User response can be, for example, activating a button (e.g., accept suggestion 304, accept suggestion 404, accept button 512, accept button 612) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

Storage system management operations are performed in response to the received user response, block 710. In an example, management agent 148 can perform operations to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Updated metric-relevant information is collected from storage unit(s) and/or external sources via one or more APIs, in block 712. Updated information can be collected based on changes implemented to provide updated metrics. The metric determination process including generation of recommendations and implementation of the recommendations (e.g., blocks 704 through 712) can be repeated.

Figure 8:
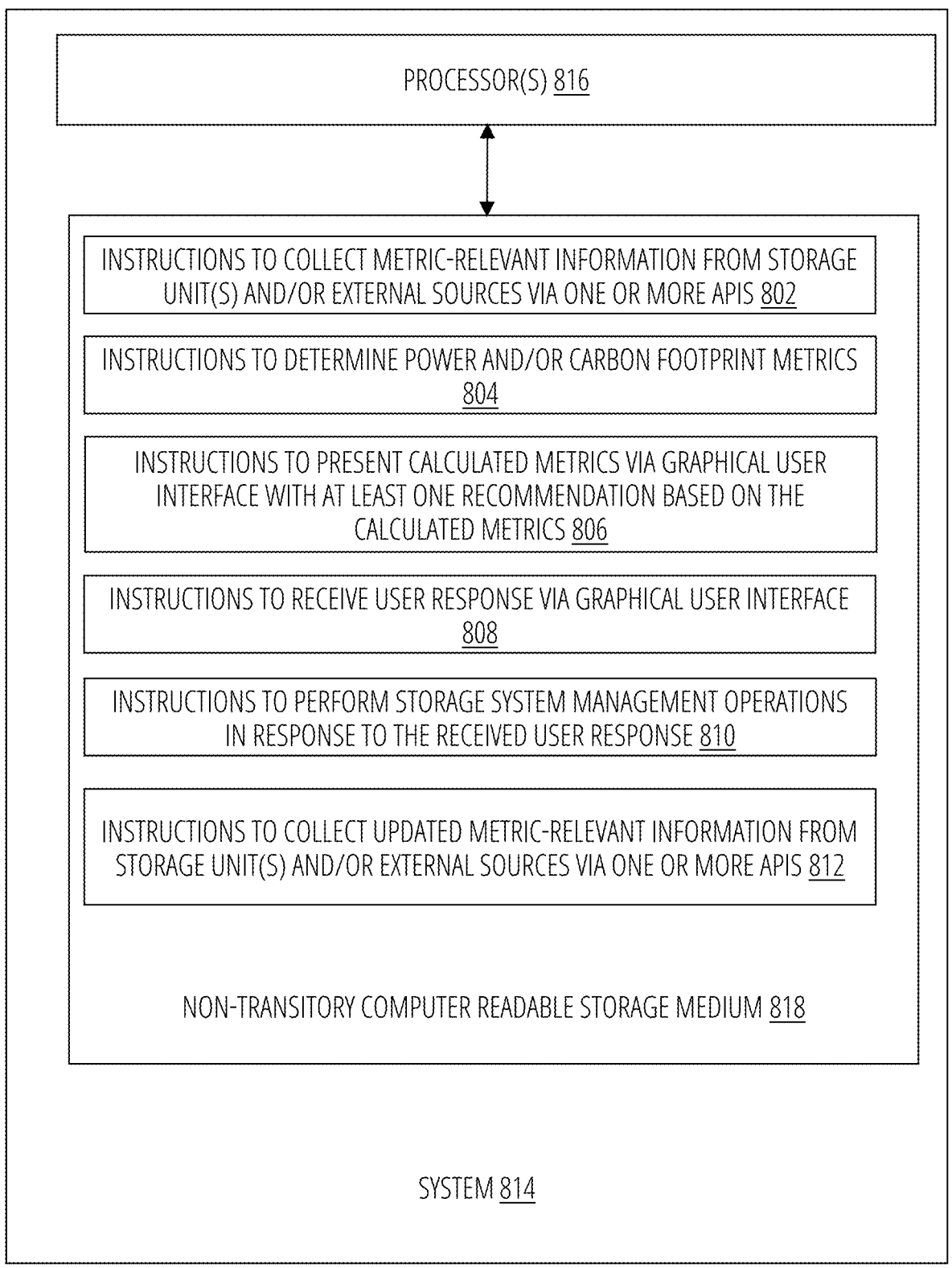
FIG. 8 is a block diagram of one example of a processing system that can provide evaluation of and response to metrics corresponding to data storage systems.

FIG. 8 is a block diagram of one example of a processing system that can provide evaluation of and response to metrics corresponding to data storage systems. In one example, system 814 can be part of a distributed computing platform (e.g., distributed computing platform 1104). In other examples, system 814 can be part of a virtual storage system (e.g., virtual storage system 1304).

In an example, system 814 can include processor(s) 816 and non-transitory computer readable storage medium 818. Non-transitory computer readable storage medium 818 may store instructions 802, 804, 806, 808, 810 and 812 that, when executed by processor(s) 816, cause processor(s) 816 to perform various functions. Examples of processor(s) 816 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 818 include tangible media such as random-access memory (RAM), read-only memory (ROM), electrically erasable programmable read-only memory (EEPROM), flash memory, a hard disk drive, etc.

Instructions 802 cause processor(s) 816 to collect metric-relevant information from storage unit(s) and/or external sources via one or more APIs. As discussed above, information (e.g., power usage, device type, workload characteristics) can be gathered from storage units (e.g., SSD, HDD, Hybrid) and/or from remote sources (e.g., device specifications). Temperature information can also be gathered.

Instructions 804 cause processor(s) 816 to determine power and/or carbon footprint metrics. The power and/or carbon footprint metrics can be determined using one or more of the example approaches described above.

Instructions 806 cause processor(s) 816 to present calculated metrics via graphical user interface with at least one recommendation based on the calculated metrics. Metrics can be provided via dashboards (e.g., example dashboard 302, example trend dashboard 402, example cold storage recommendation dashboard 504, example storage device recommendation dashboard 604) presented on one or more graphical user interfaces.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

Instructions 808 cause processor(s) 816 to receive user response via graphical user interface. User response can be, for example, activating a button (e.g., accept suggestion 304, accept suggestion 404, accept button 512, accept button 612) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all the proposed recommendations. As another example, recommendations can be presented and left to the user to execute.

Instructions 810 cause processor(s) 816 to perform storage system management operations in response to the received user response. In an example, management agent 148 can perform operations to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Instructions 812 cause processor(s) 816 to collect updated metric-relevant information from storage unit(s) and/or external sources via one or more APIs. Updated information can be collected based on changes implemented to provide updated metrics. The metric determination process including generation of recommendations and implementation of the recommendations (e.g., 804 through 812) can be repeated.

Figure 9:
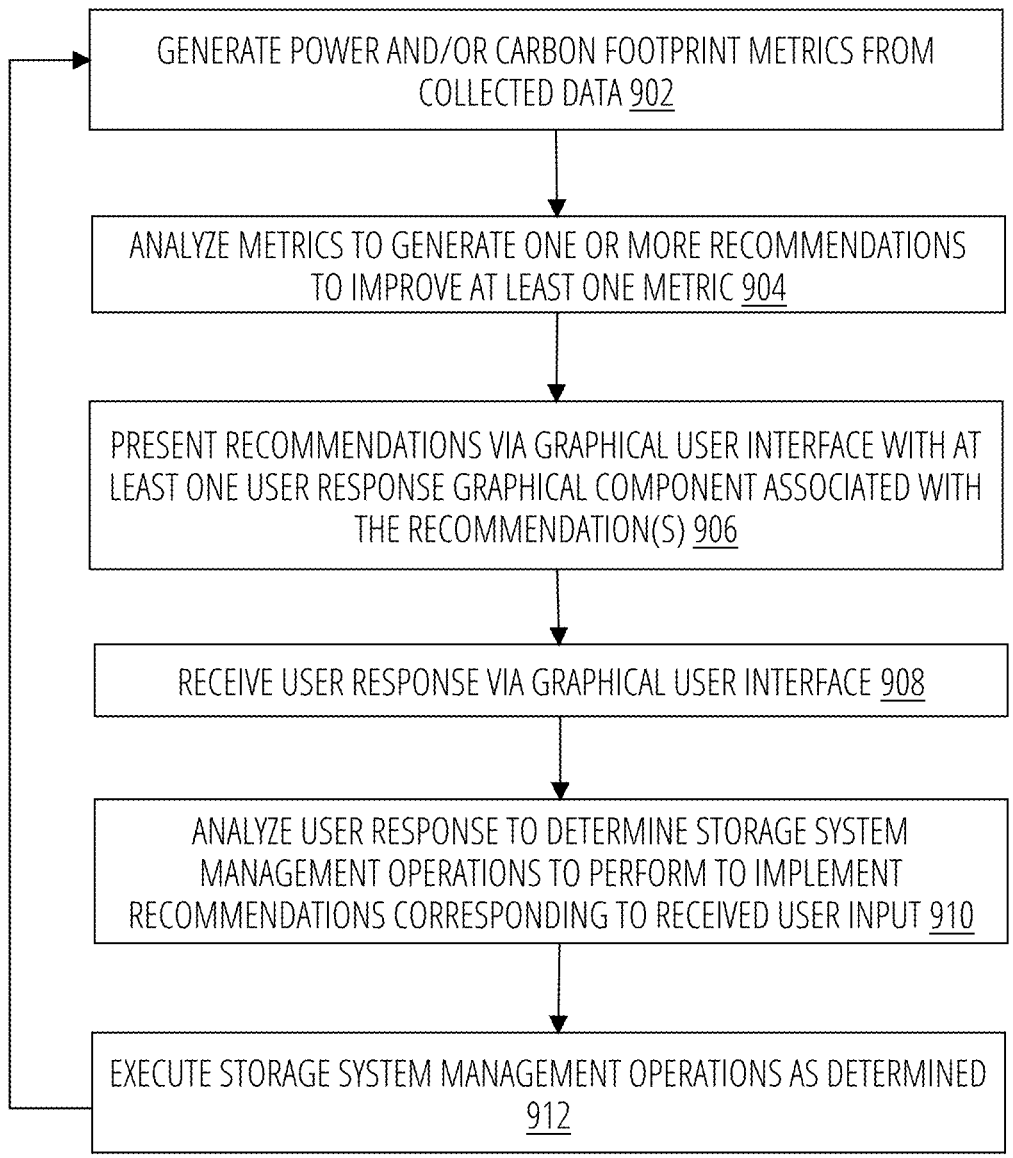
FIG. 9 is a flow diagram for one technique for evaluation of and response to metrics corresponding to data storage systems.

FIG. 9 is a flow diagram for one technique for evaluation of and response to metrics corresponding to data storage systems. The example technique of FIG. 9 can be provided, for example, by management agent 148 or other system having storage management functionality.

Power and/or carbon footprint metrics are generated from collected data, in block 902. As discussed above, collected data (e.g., power usage, device type, workload characteristics) can be gathered from storage units (e.g., SSD, HDD, Hybrid) and/or from remote sources (e.g., device specifications). Temperature information can also be gathered.

The collected metrics are analyzed to generate one or more recommendations to improve at least one metric, in block 904. The power and/or carbon footprint metrics can be determined using one or more of the example approaches described above.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

The recommendations are presented via a graphical user interface with at least graphical component associated with the recommendation(s), block in 906. Metrics can be provided via dashboards (e.g., example dashboard 302, example trend dashboard 402, example cold storage recommendation dashboard 504, example storage device recommendation dashboard 604) presented on one or more graphical user interfaces where the dashboards have buttons or other graphical features for accepting one or more recommendations.

A user response is received via the graphical user interface, block in 908. User response can be, for example, activating a button (e.g., accept suggestion 304, accept suggestion 404, accept button 512, accept button 612) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

The user response is analyzed to determine what (if any) storage system management operations to perform to implement recommendations corresponding to the user input, block in 910. In an example, management agent 148 can analyze the user input to determine what operations to perform to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

The storage system management operations can be performed (e.g., by management agent 148) to implement the recommendations accepted by the user, in block 912. Updated information can be collected based on changes implemented to provide updated metrics. The metric determination process including generation of recommendations and implementation of the recommendations (e.g., 902 through 912) can be repeated.

Figure 10:
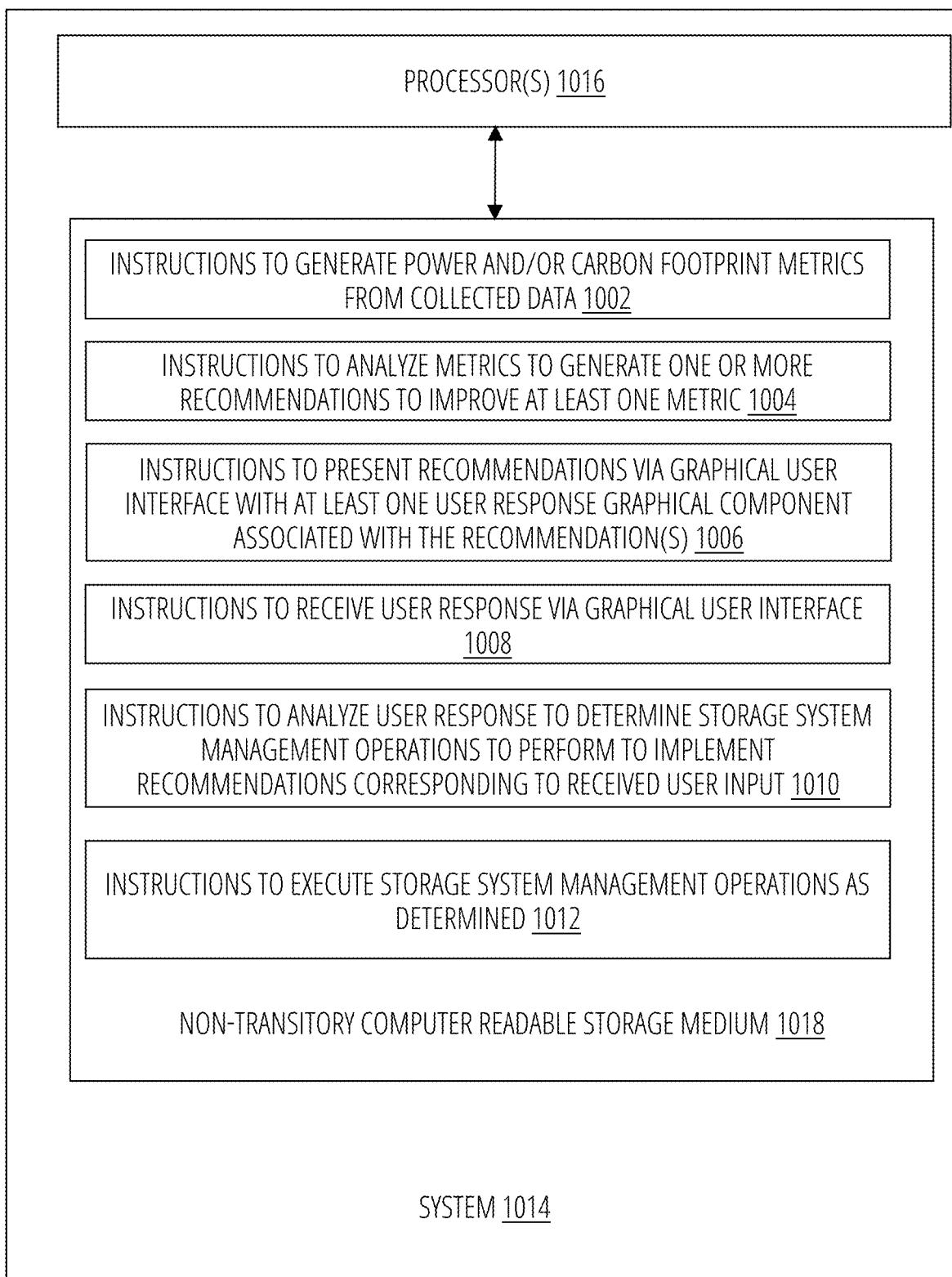
FIG. 10 is a block diagram of one example of a processing system that can provide evaluation of and response to metrics corresponding to data storage systems.

FIG. 10 is a block diagram of one example of a processing system that can provide evaluation of and response to metrics corresponding to data storage systems. In one example, system 1014 can be part of a distributed computing platform (e.g., distributed computing platform 1104). In other examples, system 1014 can be part of a virtual storage system (e.g., virtual storage system 1304).

In an example, system 1014 can include processor(s) 1016 and non-transitory computer readable storage medium 1018. Non-transitory computer readable storage medium 1018 may store instructions 1002, 1004, 1006, 1008, 1010 and 1012 that, when executed by processor(s) 1016, cause processor(s) 1016 to perform various functions. Examples of processor(s) 1016 may include a microcontroller, a microprocessor, a CPU, a GPU, a DPU, an ASIC, a FPGA, a SoC, etc. Examples of non-transitory computer readable storage medium 1018 include tangible media such as RAM, ROM, EEPROM, flash memory, a hard disk drive, etc.

Instructions 1002 cause processor(s) 1016 to generate power and/or carbon footprint metrics from collected data. As discussed above, information (e.g., power usage, device type, workload characteristics) can be gathered from storage units (e.g., SSD, HDD, Hybrid) and/or from remote sources (e.g., device specifications). Temperature information can also be gathered.

Instructions 1004 cause processor(s) 1016 to analyze metrics to generate one or more recommendations to improve at least one metric. The power and/or carbon footprint metrics can be determined using one or more of the example approaches described above.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

Instructions 1006 cause processor(s) 1016 to present calculated metrics via graphical user interface with at least one recommendation based on the calculated metrics. Metrics can be provided via dashboards (e.g., example dashboard 302, example trend dashboard 402, example cold storage recommendation dashboard 504, example storage device recommendation dashboard 604) presented on one or more graphical user interfaces where the dashboards have buttons or other graphical features for accepting one or more recommendations.

Instructions 1008 cause processor(s) 1016 to receive user response via graphical user interface. User response can be, for example, activating a button (e.g., accept suggestion 304, accept suggestion 404, accept button 512, accept button 612) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

Instructions 1010 cause processor(s) 1016 to analyze the user response to determine what storage system management operations to perform to implement the recommendations accepted via user input. In an example, management agent 148 can analyze the user input to determine what operations to perform to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Instructions 1012 cause processor(s) 1016 to execute the storage system management operations. Subsequently, updated information can be collected based on changes implemented to provide updated metrics. The metric determination process including generation of recommendations and implementation of the recommendations (e.g., 1002 through 1012) can be repeated.

Figure 11:
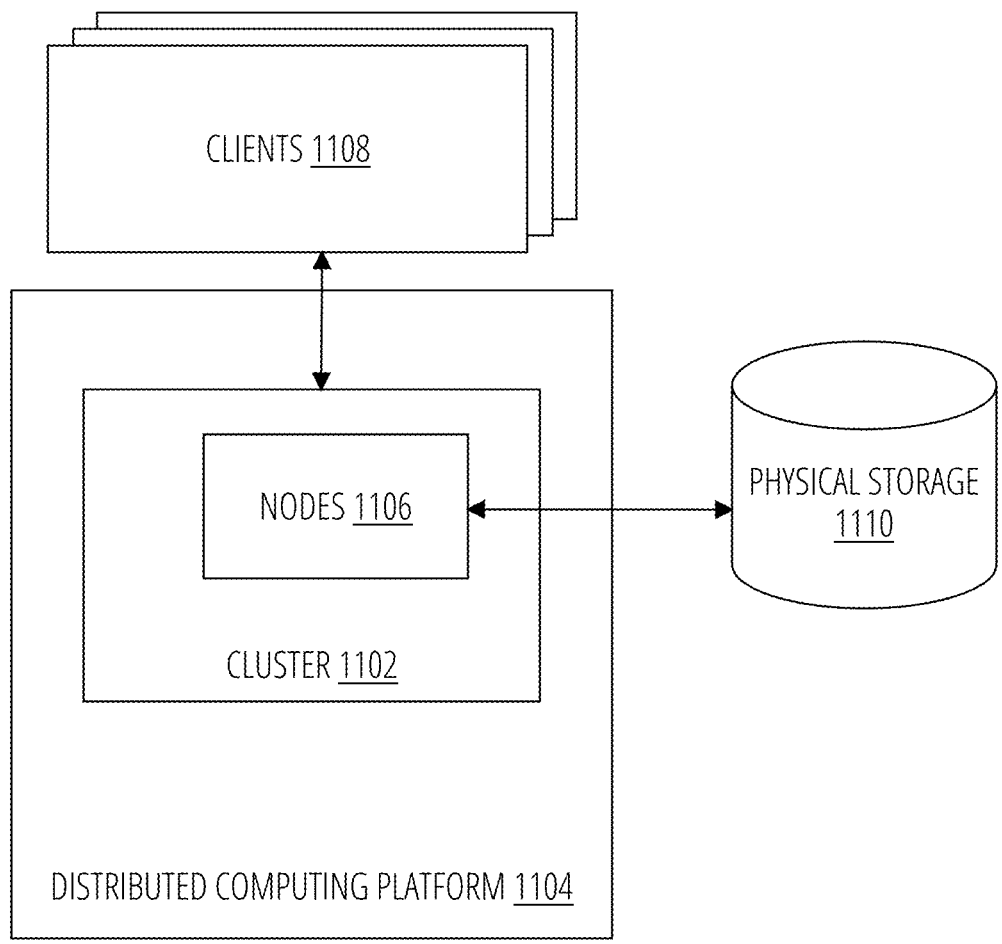
FIG. 11 is a block diagram illustrating an example of a distributed storage system in accordance with one or more embodiments.

FIG. 11 is a block diagram illustrating an example of a distributed storage system (e.g., cluster 1102) within distributed computing platform 1104 in accordance with one or more embodiments. In one or more embodiments, the distributed storage system may be implemented at least partially virtually. In the context of the present example, distributed computing platform 1104 includes cluster 1102. Cluster 1102 includes multiple nodes 1106. In one or more embodiments, nodes 1106 include two or more nodes. In an example, distributed computing platform 1104 provides the functionality of management agent 148.

Nodes 1106 may service read requests, write requests, or both received from one or more clients (e.g., clients 1108). In one or more embodiments, one of nodes 1106 may serve as a backup node for the other should the former experience a failover event. Nodes 1106 are supported by physical storage 1110. In one or more embodiments, at least a portion of physical storage 1110 is distributed across nodes 1106, which may connect with physical storage 1110 via respective controllers (not shown). The controllers may be implemented using hardware, software, firmware, or a combination thereof. In one or more embodiments, the controllers are implemented in an operating system within nodes 1106. The operating system may be, for example, a storage operating system (OS) that is hosted by the distributed storage system. Physical storage 1110 may be comprised of any number of physical data storage units. For example, without limitation, physical storage 1110 may include disks or arrays of disks, solid state drives (SSDs), flash memory, one or more other forms of data storage, or a combination thereof associated with respective nodes. For example, a portion of physical storage 1110 may be integrated with or coupled to one or more nodes 1106.

In some embodiments, nodes 1106 connect with or share a common portion of physical storage 1110. In other embodiments, nodes 1106 do not share storage. For example, one node may read from and write to a first portion of physical storage 1110, while another node may read from and write to a second portion of physical storage 1110.

Should one of the nodes 1106 experience a failover event, a peer high-availability (HA) node of nodes 1106 can take over data services (e.g., reads, writes, etc.) for the failed node. In one or more embodiments, this takeover may include taking over a portion of physical storage 1110 originally assigned to the failed node or providing data services (e.g., reads, writes) from another portion of physical storage 1110, which may include a mirror or copy of the data stored in the portion of physical storage 1110 assigned to the failed node. In some cases, this takeover may last only until the failed node returns to being functional, online, or otherwise available.

Figure 12:
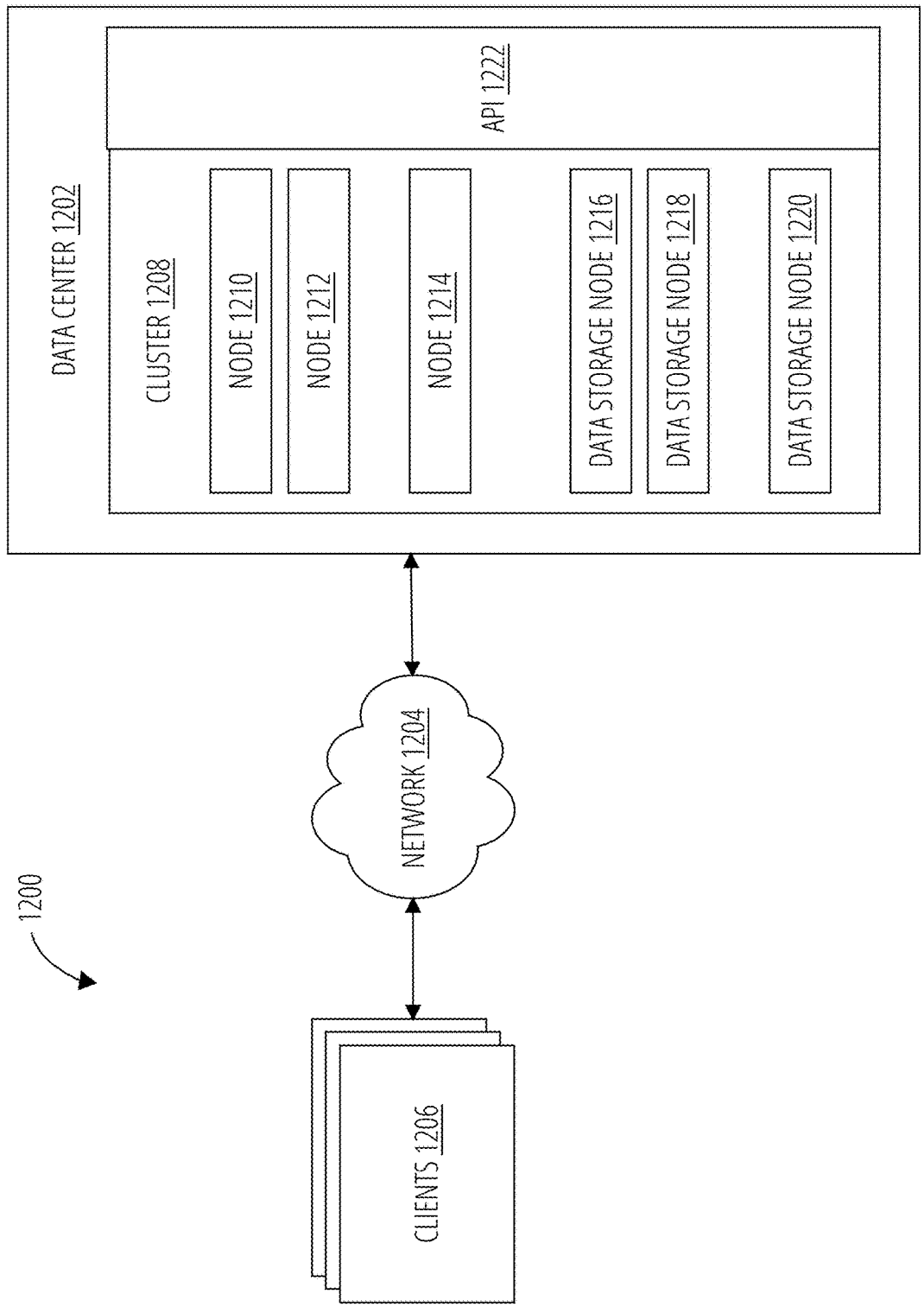
FIG. 12 is a block diagram illustrating an example on-premises environment in which various embodiments may be implemented.

FIG. 12 is a block diagram illustrating an example on-premises environment 1200 in which various embodiments may be implemented. In the context of the present example, on-premises environment 1200 includes data center 1202, network 1204, and clients 1206 (which may be analogous to clients 1108). Data center 1202 and clients 1206 may be coupled in communication via network 1204, which, depending upon the particular implementation, may be a Local Area Network (LAN), a Wide Area Network (WAN), or the Internet. Alternatively, some portion of clients 1206 may be present within data center 1202.

Data center 1202 may represent an enterprise data center (e.g., an on-premises customer data center) that is build, owned, and operated by a company or data center 1202 may be managed by a third party (or a managed service provider) on behalf of the company, which may lease the equipment and infrastructure. Alternatively, data center 1202 may represent a colocation data center in which a company rents space of a facility owned by others and located off the company premises. Data center 1202 is shown including a distributed storage system (e.g., cluster 1208). Those of ordinary skill in the art will appreciate additional information technology (IT) infrastructure would typically be part of data center 1202; however, discussion of such additional IT infrastructure is unnecessary to the understanding of the various embodiments described herein.

Turning now to cluster 1208 (which may be analogous to cluster 1102), it includes multiple nodes (e.g., node 1210, node 1212, node 1214) and multiple data storage nodes (e.g., data storage node 1216, data storage node 1218, data storage node 1220), which may be analogous to nodes 1106 and which may be collectively referred to simply as nodes) and an Application Programming Interface (API 1222). In the context of the present example, the nodes are organized as a cluster and provide a distributed storage architecture to service storage requests issued by one or more clients (e.g., clients 1206) of the cluster. Data served by the nodes may be distributed across multiple storage units embodied as persistent storage units, including but not limited to hard disk drives, solid state drives, flash memory systems, or other storage units.

API 1222 may provide an interface through which cluster 1208 is configured and/or queried by external actors. Depending upon the particular implementation, API 1222 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, API 1222 may provide access to various telemetry data (e.g., performance, configuration and other system data) relating to cluster 1208 or components thereof. As those skilled in the art will appreciate various types of telemetry data may be made available via API 1222, including, but not limited to measures of latency, utilization, and/or performance at various levels (e.g., the cluster level, the node level, or the node component level).

Figure 13:
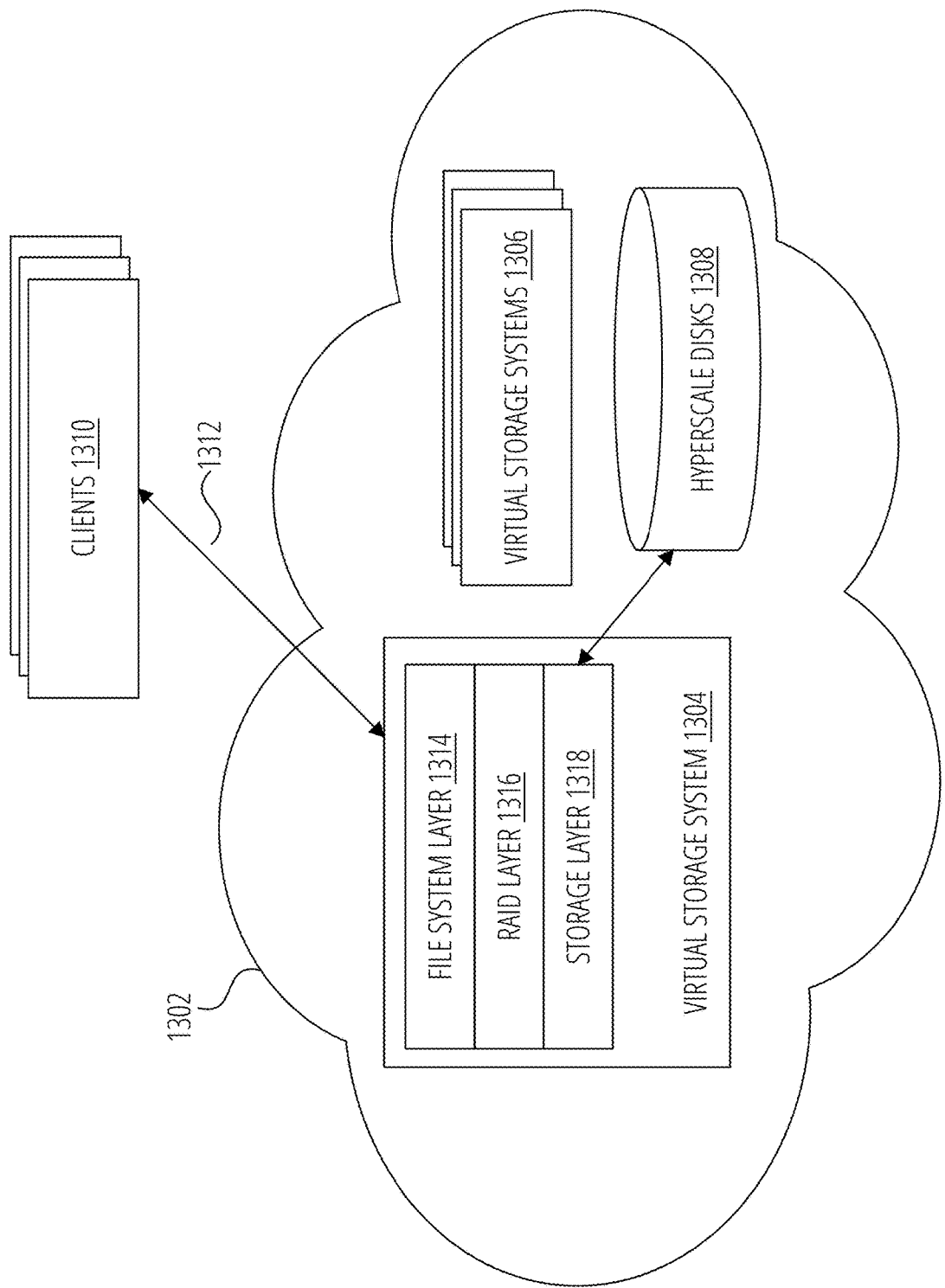
FIG. 13 is a block diagram illustrating an example cloud environment in which various embodiments may be implemented.

FIG. 13 is a block diagram illustrating an example cloud environment (e.g., hyperscaler 1302) in which various embodiments may be implemented. In the context of the present example, virtual storage system 1304, which may be considered exemplary of virtual storage systems 1306, may be run (e.g., on a VM or as a containerized instance, as the case may be) within a public cloud provided by a public cloud provider (e.g., hyperscaler 1302). In this example, virtual storage system 1304 makes use of storage (e.g., hyperscale disks 1308) provided by hyperscaler 1302, for example, in the form of solid-state drive (SSD) backed or hard-disk drive (HDD) backed disks. The cloud disks (which may also be referred to herein as cloud volumes, storage units, or simply volumes or storage) may include persistent storage (e.g., disks) and/or ephemeral storage (e.g., disks), which may be analogous to physical storage 1110. In an example, virtual storage system 1304 provides the functionality of management agent 148. Similarly, virtual storage systems 1306 can also provide the functionality of management agent 148.

Virtual storage system 1304 may present storage over a network to clients 1310 (which may be analogous to clients 1108 and clients 1206) using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 1310 may request services of virtual storage system 1304 by issuing input/output requests 1312 (e.g., file system protocol messages (in the form of packets) over the network). A representative client of clients 1310 may comprise an application, such as a database application, executing on a computer that "connects" to virtual storage system 1304 over a computer network, such as a point-to-point link, a shared local area network (LAN), a wide area network (WAN), or a virtual private network (VPN) implemented over a public network, such as the Internet.

In the context of the present example, virtual storage system 1304 is shown including a number of layers, including file system layer 1314 and one or more intermediate storage layers (e.g., RAID layer 1316 and storage layer 1318). These layers may represent components of data management software or storage operating system (not shown) of virtual storage system 1304. File system layer 1314 generally defines the basic interfaces and data structures in support of file system operations (e.g., initialization, mounting, unmounting, creating files, creating directories, opening files, writing to files, and reading from files). A non-limiting example of file system layer 1314 is the Write Anywhere File Layout (WAFL) Copy-on-Write file system (which represents a component or layer of ONTAP software available from NetApp, Inc. of San Jose, CA).

RAID layer 1316 may be responsible for encapsulating data storage virtualization technology for combining multiple hyperscale disks 1308 into RAID groups, for example, for purposes of data redundancy, performance improvement, or both. Storage layer 1318 may include storage drivers for interacting with the various types of hyperscale disks 1308 supported by hyperscaler 1302. Depending upon the particular implementation file system layer 1314 may persist data to hyperscale disks 1308 using one or both of RAID layer 1316 and storage layer 1318.

The various layers described herein, and the processing described below may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage units, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises.

In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "V+ tree" generally refers to an m-ary tree data structure with a variable number of children per node. A V+ tree consists of a root, internal nodes, and leaves.

A V+ tree can be viewed as a B+ tree in which the keys contained within the nodes are variable length.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, ROM, RAM, EPROM, EEPROM, magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 818 has stored thereon data representing sequences of instructions that, when executed by processor(s) 816, cause processor(s) 816 to perform certain operations. Similarly, non-transitory computer readable storage medium 1018 has stored thereon data representing sequences of instructions that, when executed by processor(s) 1016 cause processor(s) 1016 to perform certain operations.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
   one or more data storage devices;
   one or more hardware processors coupled with the one or more data storage devices, the one or more hardware processors to execute instructions from the one or more data storage devices, to:
   collect metric-relevant information from at least the one or more data storage devices;
   collect at least characteristics corresponding to power sources available to provide power to the one or more data storage devices;
   generate metrics associated with the one or more data storage devices based on at least the collected metric-relevant information and the characteristics corresponding to the power sources;
   generate one or more recommendations based on the generated metrics;
   present, in a human-readable format, the one or more recommendations;
   receive user input corresponding to selection of at least one of the one or more recommendations;
   analyze the received user input to determine changes to at least an operating state or an operating environment of the one or more data storage devices to implement the selected recommendations; and
   cause the selected recommendations to be implemented by implementing the changes.

2. The system of claim 1 wherein the metrics are based, at least in part, on collected data gathered from the one or more data storage devices and from remote sources that provide device-specific specifications.

3. The system of claim 2 wherein the remote sources comprise at least characteristics corresponding to power sources available to provide power to one or more portions of the system.

4. The system of claim 1 wherein the selected recommendations to be implemented comprise at least migration of data between specific data storage devices.

5. The system of claim 1 wherein the selected recommendations to be implemented comprise at least deactivation of at least one of the one or more data storage devices.

6. The system of claim 1 wherein at least a portion of the one or more recommendations are based, at least in part, on calculated metrics that can be compared to one or more of desired performance metrics, or corresponding metrics of other components in an operating environment corresponding to at least a subset of the one or more data storage devices.

7. A management agent in a distributed storage system having one or more data storage devices, the management agent comprising:
   a memory to store instructions;
   a processor coupled with the memory, the processor configured by the instructions to:
   collect metric-relevant information from at least the one or more data storage devices;
   collect at least characteristics corresponding to power sources available to provide power to the one or more data storage devices;
   generate metrics associated with the one or more data storage devices based on at least the collected metric-relevant information and the characteristics corresponding to the power sources;
   present, in a human-readable format, one or more recommendations based on the generated metrics;
   receive user input indicating selection of at least one of the one or more recommendations; and
   cause the selected recommendations to be implemented within the distributed storage system by implementing changes to at least an operating state or an operating environment of the one or more data storage devices.

8. The management agent of claim 7 wherein
   a first portion of the metrics are based, at least in part, on collected data gathered from the one or more data storage devices;
   a second portion of the metrics are collected from remote sources that provide device-specific specifications; and
   the human-readable format comprises one or more portions of a graphical user interface (GUI).

9. The management agent of claim 8 wherein the remote sources comprise at least characteristics corresponding to power sources available to provide power to one or more portions of the system.

10. The management agent of claim 7 wherein the selected recommendations to be implemented comprise at least migration of data between specific data storage devices.

11. The management agent of claim 7 wherein the selected recommendations to be implemented comprise at least deactivation of at least one of the one or more data storage devices.

12. The management agent of claim 7 wherein at least a portion of the one or more recommendations are based, at least in part, on calculated metrics that can be compared to one or more of desired performance metrics, or corresponding metrics of other components in an operating environment corresponding to at least a subset of the one or more data storage devices.

13. A non-transitory computer readable medium having stored thereon instructions that, when executed by one or more processors, cause a system to:
collect metric-relevant information from at least the one or more data storage devices;
collect at least characteristics corresponding to power sources available to provide power to the one or more data storage devices;
generate metrics associated with the one or more data storage devices based on at least the collected metric-relevant information and the characteristics corresponding to the power sources;
generate one or more recommendations based on the generated metrics;
present, in a graphical user interface (GUI), the one or more recommendations having corresponding interface buttons, selection of which cause the selected recommendations to be implemented;
receive user input indicating selection of at least one of the one or more recommendations; and
cause the selected recommendations to be implemented within the distributed storage system by implementing changes to at least an operating state or an operating environment of the one or more data storage devices.

14. The non-transitory computer readable medium of claim 13 wherein a first portion of the metrics are based, at least in part, on collected data gathered from the one or more data storage devices, and a second portion of the metrics are collected from remote sources that provide device-specific specifications.

15. The non-transitory computer readable medium of claim 14 the second portion of the metrics comprises at least characteristics corresponding to power sources available to provide power to one or more portions of the system.

16. The non-transitory computer readable medium of claim 13 wherein the selected recommendations to be implemented comprise at least migration of data between specific data storage devices.

17. The non-transitory computer readable medium of claim 13 wherein at least a portion of the recommendations are based, at least in part, on calculated metrics that can be compared to one or more of desired performance metrics, or corresponding metrics of other components in an operating environment corresponding to at least a subset of the one or more data storage devices.

18. A method, comprising:
collecting, by a processor, metric-relevant information from at least one or more data storage devices;
collecting, by the processor, at least characteristics corresponding to power sources available to provide power to the one or more data storage devices;
generating, by the processor, metrics associated with the one or more data storage devices based on at least the collected metric-relevant information and the characteristics corresponding to the power sources;
generating, by the processor, one or more recommendations based on the generated metrics;
evaluating, by the processor, a user input corresponding to a selection of at least one of the one or more recommendations to determine changes associated with the one or more data storage devices to implement the selected recommendations; and
causing implementation of the selected recommendations by implementing changes to at least an operating state or an operating environment of the one or more data storage devices.

19. The method of claim 18, wherein the metrics are based, at least in part, on collected data gathered from the one or more data storage devices that are part of a distributed storage system and from remote sources that provide device-specific specifications, the remote sources comprise at least characteristics corresponding to power sources available to provide power to one or more portions of the system.

20. The method of claim 18, wherein the selected recommendations to be implemented comprise at least migration of data between specific data storage devices.

21. The method of claim 18, wherein the selected recommendations to be implemented comprise at least deactivation of at least one of the one or more data storage devices.

22. The method of claim 18, wherein at least a portion of the recommendations are based, at least in part, on calculated metrics that can be compared to one or more of desired performance metrics, or corresponding metrics of other components in an operating environment corresponding to at least a subset of the one or more data storage devices.

* * * * *